(12) United States Patent
Kaercher et al.

(10) Patent No.: US 6,713,016 B2
(45) Date of Patent: Mar. 30, 2004

(54) SYSTEM FOR THERMALLY TREATING WORKPIECES WITH AN EXPLOSIVE GAS MIXTURE, IN PARTICULAR, A THERMAL DEBURRING SYSTEM

(75) Inventors: Jochen Kaercher, Stuttgart (DE); Benedikt Breitbach, Ditzingen (DE)

(73) Assignee: Extrude Hone Ltd., Co. Clare (IE)

( * ) Notice: Subject to any disclaimer, the term of this patent is extended or adjusted under 35 U.S.C. 154(b) by 70 days.

(21) Appl. No.: 10/100,976

(22) Filed: Mar. 19, 2002

(65) Prior Publication Data

US 2002/0145238 A1 Oct. 10, 2002

(30) Foreign Application Priority Data

Apr. 4, 2001 (DE) .......................... 101 16 726

(51) Int. Cl.[7] .............................. B23K 7/06
(52) U.S. Cl. ........................... 266/51; 266/48
(58) Field of Search ................ 266/48, 49, 51; 432/159, 205

(56) References Cited

U.S. PATENT DOCUMENTS

| | | | |
|---|---|---|---|
| 4,591,339 A | * 5/1986 | Conrad et al. | 432/205 |
| 4,712,998 A | * 12/1987 | Conrad | 432/159 |
| 4,740,152 A | 4/1988 | Conrad et al. | |
| 4,755,136 A | 7/1988 | Gotte | |
| 4,796,867 A | * 1/1989 | Bozhko et al. | 266/51 |
| 4,802,654 A | * 2/1989 | Bozhko et al. | 266/51 |
| 4,925,499 A | * 5/1990 | Wohr | 266/51 |

FOREIGN PATENT DOCUMENTS

EP 0 211 848 B1 3/1989

* cited by examiner

Primary Examiner—Scott Kastler
(74) Attorney, Agent, or Firm—Michael J. Striker

(57) ABSTRACT

A system for the thermal treatment of work pieces with an explosive gas mixture, in particular, a thermal deburring system, has a processing chamber (10), which includes a combustion chamber (12) for receiving the work pieces. A supply channel (18) for the gas mixture opens into the combustion chamber (12). In the combustion chamber (12), a device is provided, which has a plurality of openings through which the flame front passes for thermally treating the work pieces. The device can be one that connects to the supply channel (18), preferably in the form of a tube (26) with a plurality of openings (28), which can be made from an extruded sheet. The work pieces obtain a more uniform processing or deburring effect, since the flame front passes through the many small openings of the device. The small openings (28) serve also as throttles, whereby the entire combustion process runs for a longer time.

9 Claims, 1 Drawing Sheet

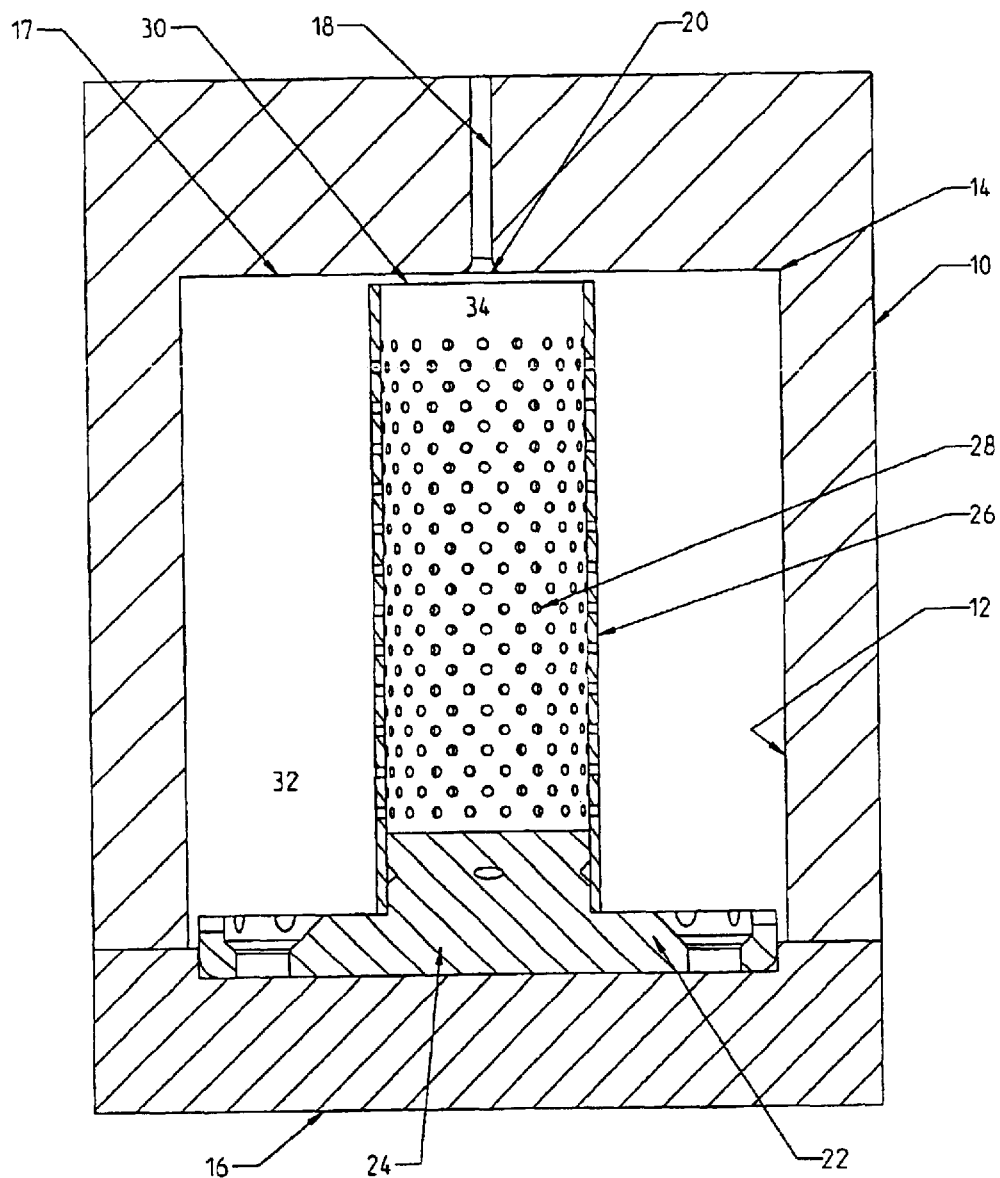

SYSTEM FOR THERMALLY TREATING WORKPIECES WITH AN EXPLOSIVE GAS MIXTURE, IN PARTICULAR, A THERMAL DEBURRING SYSTEM

BACKGROUND OF THE INVENTION

The present invention relates to an system for the thermal treatment of work pieces with an explosive gas mixture, particularly a thermal deburring system.

An apparatus of this type, such as the one disclosed in EP 0 211 848 B1, has a processing chamber, which contains a combustion chamber for receiving the work piece. A system formed of several channels, which open at various sites in the combustion chamber, is connected to a supply channel. This system of channels performs an additional mixing of the gas mixture. In addition, the flame front coming from the ignition point and running to the supply channel is divided into a plurality of flame jets before their introduction into the combustion chamber. The flame jets enter at various points into the combustion chamber, whereby a relatively large volume of the mixture is simultaneously ignited. The possibility thus exists that one of these flame jets will contact an individual work piece or an area of the work piece, whereby the processing or deburring results can be non-uniform.

SUMMARY OF THE INVENTION

In contrast, the inventive system for the thermal treatment of work pieces with an explosive gas mixture, in particular, a thermal deburring system, has the advantage that a uniform processing or deburring effect on the work pieces can be achieved, since a unit or device is provided in the combustion chamber that has a plurality of openings, through which the flame front passes for heat-treating the work pieces. Preferably, the combustion chamber is divided into two areas by the unit, whereby the work pieces are arranged in one area and the flame front is released in another area. In another, further advantageous embodiment, the unit is connected to the supply channel. Therefore, an existing system, whose ignition source—for example, in the form of an ignition plug—is disposed in an ignition channel, can be converted in a simple manner to a system of the present invention.

Since the flame front passes through many small openings of the unit or device, it is large in relation to the volume of the combustion chamber. The small openings serve also as throttles, whereby the combustion, in total, runs longer, which serves to protect the work pieces.

In a further preferred embodiment of the invention, the device is formed as a tube or pipe. In this manner, the forces that originate from the pressure wave are mutually offset. The tube is also particularly well-suited for simple mounting to the processing chamber and can easily be changed.

Further advantages and advantageous embodiments of the inventive system for heat-treating of work pieces with an explosive gas mixture, in particular, thermal a thermal deburring system, are provided in the following description.

BRIEF DESCRIPTION OF THE DRAWING

FIG. 1 shows a processing chamber of the system of the present invention for heat-treating work pieces with an explosive gas mixture, in particular, a thermal deburring system.

DESCRIPTION OF THE PREFERRED EMBODIMENT

FIG. 1 shows a processing chamber 10 of a system (not specifically shown) for the thermal or heat-treatment of work pieces with an explosive gas mixture, in particular, a thermal deburring system. In this connection, reference is specifically made to EP 0 211 848 B1 or U.S. Pat. No. 4,740,152, where the principle structure and the manner of operation of this type of system is explicitly illustrated.

The processing chamber 10 includes a combustion chamber 12 for receiving the work pieces (not shown). The processing chamber 10 comprises a bell 14, which preferably is round or cup-shaped, and a closure means or locking means, in the form of a locking plate 16 disposed under the bell 14. The combustion chamber 12 has a cylindrical shape, however, also shapes with round, angular, constant, or changing cross-sectional areas in the longitudinal direction are contemplated.

Preferably, in the upper, flat side 17 of the bell 14 of the processing chamber, a supply channel 18 is formed for a gas mixture, which flows into the combustion chamber 12 and thereby forms a mouth or port 20.

By means of the locking plate 16, the processing chamber 10 can be opened and closed for receiving processed work pieces and for lining up work pieces to be processed. Preferably, a base plate 22 is provided on the locking plate 16, the base plate 22 having a mounting means 24 disposed in the combustion chamber 12 for securing a device in the form of a tube or pipe 26, which is provided with a plurality of small, lateral openings 28. The mounting means 24 In the present embodiment is a peg or pin, onto which the tube 26 is inserted. Alternatively, the tube 26 can be inserted into a depression or recess in the base plate 22. Therefore, the tube 26 extends substantially from the mouth 20 of the supply channel 18 to the base plate 22, or the closure or locking means in the form of the locking plate 16. Alternatively, the tube 26 can be directly disposed on the closure means or locking plate 16. It is likewise possible to secure the tube 26 onto the bell 14 itself.

It is also contemplated that the mouth 20 and the base plate 22, or the locking means, of the processing chamber 10, are not disposed opposite one another. However, it is advantageous, then, if the tube 26 projecting into the combustion chamber 12 extends substantially from the mouth 20 of the supply channel 18 in the combustion chamber 12 to the side of the combustion chamber 12 that lies opposite to the mouth 20; this means, essentially, that the tube 26 can also be shorter than the distance between the mouth 20 and the opposite side. In this manner, for example, the dangers of negative effects of the finishing-related tolerances, which are associated with using a tube 26 that is too long, are minimized.

As shown in FIG. 2, a slit or gap 30 can be provided between the mouth 20 and the tube 26. However, it is most essential that the tube 26 is connected to the supply channel 18 or its mouth 20 and has a plurality of lateral openings 28. Preferably, the tube 26 penetrates the entire combustion chamber 12.

The tube 26 is likewise cylindrically shaped, based on the cylindrical shape of the combustion chamber 12. The tube 26, however, can also have a round or angular cross-sectional area in the longitudinal direction, as well as a constant or changing cross-sectional area, when viewed in the longitudinal direction. Preferably, the material of the tube 26 is heat resistant. Since the tube 26 has a plurality of lateral openings 28, the tube 26 is made from a perforated sheet, preferably in the form of an extruded sheet. However, the use of expanded metal or metal mesh is also possible. Alternatively, metal wire webbing can be used, which eventually is reinforced with bars or rods. A tube 26 made from an extruded sheet or a perforated sheet, however, is simpler to make and is sufficiently stable.

With the thermal treatment of work pieces with an explosive gas mixture, particularly with thermal deburring, first one or more work pieces are placed on the base plate 22 of the opened processing chamber 10 or in a holder disposed on the base plate 22. Next, the processing chamber 10, or the combustion chamber 12, is closed. Next, oxygen and a combustible gas are mixed and supplied to the combustion chamber 12 via the supply channel 18, where it is uniformly or evenly divided. With regard to the details of the mixing, supplying, and ignition of the gas mixture, reference is specifically made to EP 0 211 848 or U.S. Pat. No. 4,740,152.

The gas mixture is ignited by an ignition plug (not illustrated) disposed in the supply channel 18. The flame then strikes the mouth in the tube 26. Since the existing flame front then passes through the many lateral openings 28 over the entire length of the tube 26 into the combustion chamber 12, the flame is relatively large with respect to the volume of the combustion chamber 12. The small openings 28 serve also as throttles, thereby prolonging the entire combustion process. In this manner, the work pieces obtain a more uniform processing or deburring effect.

It is essential that the combustion chamber 12 is divided into two areas 32, 34 by the tube 26. In one area 32, which is outside of the tube 26, the work pieces are disposed. In another area 34, which is connected to the supply channel 18, that is inside the tube 26, the flame front is released, which contacts the work pieces. From the area 34, the flame front uniformly moves through the openings 28 to thermally treat or debur the work pieces. The opposite arrangement is also contemplated and possible: that is, that the work pieces are arranged within the tube 26 and the flame is released through an ignition source outside of the tube 26.

Instead of the tube 26, a flat or wobbled device with a plurality of openings 28 for allowing passage of the flame can be provided for thermally treating the work pieces. It is essential that the combustion chamber 12 is divided by the device, such that the flame front is optimized for the processing procedures in connection with the nature of the work places. It is therefore important that the combustion chamber is divided into two areas 32, 34 by the device, whereby the work pieces are disposed in one area 32 and the flame front is released in another area 34. Preferably, the flame front should be as large as possible.

It is also possible that the flame front is not released at the position at which it exits the supply channel 18. The flame front could also be released on the other side. For example, a device in the form of a hollow cone with a plurality of openings 28 can be disposed on the lock or on the base plate 22, in which an ignition source—for example, in the form of an ignition plug—is provided. The work pieces are thereby arranged outside of the cone. It is essential that the flame front first moves through the device and then contacts the work pieces for processing them.

However, the tube 26 is the preferred embodiment, since the forces produced by the pressure waves of the explosion are diametrically directed outwardly and preserved on both sides. In addition, the tube 26 can be easily changed.

It will be understood that each of the elements described above, or two or more together, may also find a useful application in other types of constructions differing from the types described above.

While the invention has been illustrated and described herein as a system for heat-treating work pieces, particularly a thermal deburring system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A thermal deburring system for thermal treatment of work pieces with a flame front resulting from an ignition of an explosive gas mixture, comprising, a processing chamber having a combustion chamber for receiving the work pieces and a supply channel (18) for the gas mixture which opens into said combustion chamber, and a device having a plurality of openings and being disposed in said combustion chamber so that said flame front first passes the device before thermally treating the work pieces.

2. The system according to claim 1, wherein the combustion chamber is divided into two areas by the device, wherein the work pieces are positioned in one area and the flame front is released into the other area.

3. The system according to claim 1, wherein the device is connected to the supply channel.

4. The system according to claim 1, wherein a tube is connected to the supply channel, said tube having a plurality of lateral openings.

5. The system according to claim 4, wherein the tube extends substantially from a mouth of the supply channel to a side of the combustion chamber lying opposite to the mouth.

6. The system according to claim 4, wherein the tube is secured on a locking means of the processing chamber.

7. The system according to claim 1, wherein the device is made of an extruded sheet.

8. The system according to claim 1, wherein the device is made of metal wire webbing.

9. The system according to claim 2, wherein the openings throttle said flame front.

* * * * *